United States Patent [19]

Kitabatake et al.

[11] Patent Number: 4,796,982
[45] Date of Patent: Jan. 10, 1989

[54] OPTICAL VALVE

[75] Inventors: Makoto Kitabatake, Katano; Kentaro Setsune, Sakai; Kiyotaka Wasa, Nara, all of Japan

[73] Assignee: Matsushita Electric Industrial Co., Ltd., Kadoma, Japan

[21] Appl. No.: 629,842

[22] PCT Filed: Nov. 10, 1983

[86] PCT No.: PCT/JP83/00402
§ 371 Date: Jul. 6, 1984
§ 102(e) Date: Jul. 6, 1984

[87] PCT Pub. No.: WO84/02010
PCT Pub. Date: May 24, 1984

[30] Foreign Application Priority Data
Nov. 11, 1982 [JP] Japan .................. 57-198688

[51] Int. Cl.$^4$ ............................................ G02F 1/01
[52] U.S. Cl. .................................. 350/356; 350/353; 350/359
[58] Field of Search ............ 350/353, 356, 96.15, 350/96.19, 359, 374, 377, 394, 402, 354, 355, 357, 286

[56] References Cited

U.S. PATENT DOCUMENTS

| 3,307,897 | 3/1967 | Lohmann | 350/356 |
|---|---|---|---|
| 3,443,098 | 5/1969 | Lewis | 250/199 |
| 3,484,722 | 12/1969 | Barker, Jr. et al. | 332/4 |
| 3,584,223 | 6/1971 | Aldrich et al. | 350/356 |
| 3,872,451 | 3/1975 | McNaney | |
| 4,249,796 | 2/1981 | Sincerbox et al. | 350/370 |
| 4,283,113 | 8/1981 | Eclen | 350/96.15 |

FOREIGN PATENT DOCUMENTS 56-101123 1/1980 Japan .
56-5525 5/1980 Japan .

OTHER PUBLICATIONS

"Total Reflection Liquid-Crystal Electrooptic Device", by R. A. Kashnov, Applied Optics, vol. 12, No. 10, Oct. 1973, pp. 2309-2311.
"Nematic Liquid Crystal Digital Light Deflector", by G. Labrunie, Applied Optics, vol. 13, No. 8, Aug. 1974, pp. 1802-1806.
"Un Commutateur a cristal liquide pour fibres optiques", Mesures Regulation Automatisme, vol. 44, No. 10, Oct. 1979, p. 29.
Gordon II et al., IBM Technical Disclosure Bulletin, Oct. 1979, vol. 22, No. 5, p. 2074.

Primary Examiner—Bruce Y. Arnold
Attorney, Agent, or Firm—Spencer & Frank

[57] ABSTRACT

An optical switch comprising a transparent prism having a light input surface and a light output surface, and a reflective control layer having a refractive index higher than that of said prism and a thickness not smaller than the wavelength of the light applied to the optical valve. The reflective control layer is constituted by a thin film of electrooptical material or a thin film of a heat-sensitive optical material. When the reflective control layer is made of an electrooptical material, the optical valve can selectively reflect or transmit the light by controlling the electric field applied to the reflective control layer. When the heat-sensitive material is used as the material of the reflective control layer, a similar switching function can be attained by controlling an electric current supplied to a heat generating member attached to the reflective control layer. This optical valve can switch light at high-speed to selectively obtain reflected light and transmitted light and, hence, can be used as optical parts such as switches and modulators for optical communication system and parts of equipments such as projection type television receivers and printers.

15 Claims, 2 Drawing Sheets

OPTICAL VALVE

FIELD OF THE INVENTION

The present invention relates to an optical valve for switching on and off a light beam and, more particularly, to a basic arrangement of a high-speed optical valve for switching on and off a laser beam or a white light beam.

BACKGROUND ART

A conventional mechanical optical valve, such as a rotary chopper, rotary mirror or the like, has been able to provide only a low switching speed on the order of several tens of kHz. On the other hand, modern high quality image processing requires a high switching speed of several tens of MHz. Thus, the conventional mechanical optical valve cannot be used practically for such purposes.

SUMMARY OF THE INVENTION

Under these circumstances, the present invention aims at providing a novel high-speed optical valve which is capable of switching a light beam electrically.

To this end, the invention provides an optical valve comprising a transparent prism having a light input surface and a light output surface, is formed with a reflective control layer directly deposited on the bottom surface of the prism, wherein the switching of light is effected by applying an electric signal to the reflective control layer.

DESCRIPTION OF THE BEST MODE FOR CARRYING OUT THE INVENTION

Figure 1:
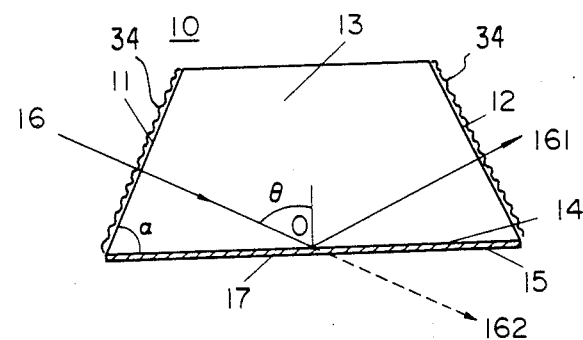
FIG. 1 is a sectional view showing a basic arrangement of an optical valve in accordance with the invention.

Referring first to FIG. 1 showing the basic arrangement of an optical valve in accordance with the invention, the optical valve 10 including a transparent prism 13 having a light input surface 11 and a light output surface 12, is characterized by a reflective control layer 15 deposited on the bottom surface 14 of the prism 13. The refractive index of the prism 13 is selected to be greater than that of the reflective control layer 15. A light beam 16 is applied to the prism 13 at an incidence angle $\theta$, toward the central point O of the bottom surface through the light input surface 11. If the angle $\theta$ of incidence is greater than the total reflection critical angle which is determined by the prism 13 and the reflective control layer 15, the incident light is totally reflected at the central point O of the bottom surface of the prism 13 and is emitted through the output surface 12 as the reflected light 161. On the other hand by selecting an incident angle $\theta$ which is slightly smaller than the critical angle mentioned above the incident light 16 passes through the central point O of the bottom surface and is emitted through the bottom surface 14 of the prism as the transmitted light 162, because the condition for total reflection is not met in this case. If, however, the refractive index of the reflective control layer 15 is decreased by, for example, an externally supplied electric signal, the above-mentioned condition for total reflection is satisfied so that the incident light is totally reflected and emitted as the reflected light 161. Obviously, the same incident light can be emitted as the transmitted light 162 by increasing the refractive index of the reflective control layer 15 by the electric signal. Thus, the prism 13 serves as an optical switch for switching the incident light either to the reflected light 161 or the transmitted light 162.

The present inventors have found that, when using a thin deposited film of an electro-optical material having a film thickness not smaller than the wavelength of the incident light 16 and by applying an electric field as the electric signal around the central point O of the reflective control layer 15, it is possible to decrease the refractive index around the central point O thereby attaining a valve function for switching the light. Examples of such electrooptical material are materials of the $ABO_3$ type, such as $LiNbO_3$, $LiTaO_3$, PLZT[(Pb,La)(Zr,Ti)$O_3$], PBZT[(Pb,Ba)(Zr,Ti)$O_3$], PSZT[Pb(Sn,Zr,Ti)$O_3$], KTN[K(Ta,Nb)$O_3$], and SBN[(Sr,Ba)Nb$_2$O$_6$]. The application of the electric field is made by, for example, applying a voltage between a pair of parallel electrodes on the outer surface 17 of the reflective control layer 15 at opposite sides of the central point O.

The use of a material having the $ABO_3$ type structure as the material of the thin film of electrooptical material is not exclusive and other types of structure can be used provided that a sufficiently large change of the refractive index, e.g. $10^{-1}$ to $10^{-2}$, is caused by the application of the electric field.

Figure 3:
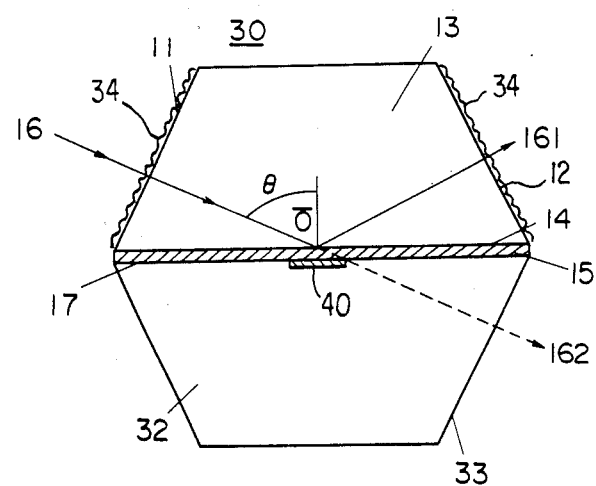
FIG. 3 is a sectional view of an improved optical valve in accordance with the invention.
Figure 4:
FIG. 4 is a plan view of a heat generating member.

The inventors have also found that, by using a thin film of a heat-sensitive optical material having a deposited thickness not smaller than the wavelength of the incident light 16 and by applying heat to the portion of the prism around the central point O of the reflective control layer 15, it is possible to increase the refractive index in the portion of the prism around the central point O so as to provide an optical valve function for switching the light beam. The photosensitive optical material is a material the refractive index of which is widely changed in response to heat. Examples of such heat-sensitive optical material are: $ABO_3$ type compounds such as $LiNBO_3$, $LiTaO_3$, PLZT, PBZT, PSZT, KTN and SBN; sillenite compounds such as BGO($Bi_{12}GeO_{20}$), BSO($Bi_{12}SiO_{20}$) and the like; and transition metal compounds such as $TiO_2$, $Nb_2O_5$ and so forth. The application of heat can be carried out by providing a heat generating member in the form of a thin film electric resistor, e.g., a thin film nickel-chromium resistor, on the outer surface of the reflective control layer 15 around the central point O and supplying electric current as the electric signal to the resistor. A good result is obtained by using a horse-shoe shaped thin film heat generating member 40 as shown in FIGS. 3 and 4 and supplying an electric current thereto by applying a voltage between both ends thereof. If the thin film of heat-sensitive optical material has a low electrical insulation power, the heat may be applied by supplying the electric current directly to the thin film of heat-sensitive optical material, through a pair of parallel electrodes attached to the outer surface of the heat-sensitive optical material at opposite sides of the central point O, instead of providing the heat generating body in the form of a thin film electric resistor. In this case, the heat is generated directly in the thin film of the heat-sensitive optical material by the electric current directly supplied thereto.

Figure 2:
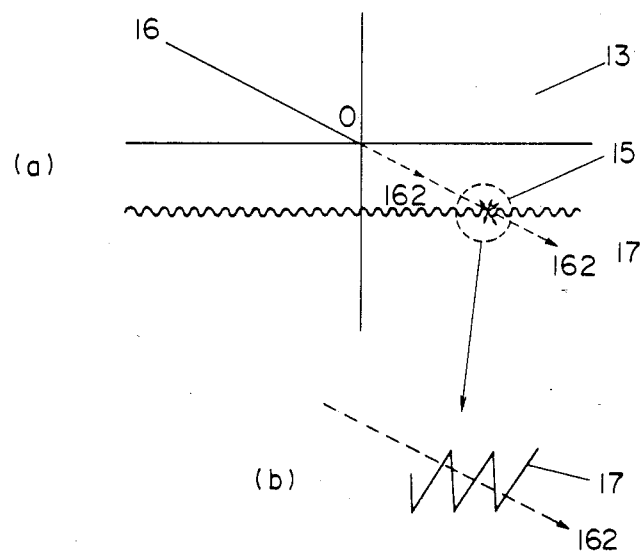
FIG. 2 is a sectional view showing an essential part of an embodiment of the optical valve in accordance with the invention.

In the optical valve 10 shown in FIG. 1, if the surface 17 of the reflective control layer 15 is smooth, the light impinging upon the central point O, which is to be emitted therefrom as the transmitted light 162, is totally reflected by the surface 17 thereby returning to the prism 13. The light then travels through the prism in a side-by-side relation to the reflected light 161, so that the extinction ratio of the optical valve 10 is impaired disadvantageously. According to the invention, therefore, the outer surface 17 is roughened as shown in FIG. 2a to ensure that a large part of the light 162 is emitted to the outside of the prism, thereby preventing the total reflection of the light. Preferably, the roughened surface has saw-tooth shaped stripes as shown in FIG. 2b arranged such that the longitudinal axis of each stripe extends at a right angle to the direction of the transmitted light 162. With such a roughened surface, the light 162 can be effectively emitted to the outside of the prism so that the property of the optical valve, e.g., the extinction ratio is very much improved.

FIG. 3 shows another embodiment of the optical valve in accordance with the invention. This optical valve 30 has a prism 32 adhered to the outer surface 17 of the reflective control layer 15, prism 32 being made of an optical material having a refractive index equal to or greater than that of the prism 13. The inventors have found that this additional prism 32 facilitates the emission of the transmitted light 162 to the outside of the prism 13 to improve operation charcteristics such as the extinction ratio, while stabilizing the switching operation.

The inventors have confirmed also that the light intensity can be increased and a higher switching performance can be obtained by forming non-reflective coating layers 34 on the light input surface 11 and the light output surface 12 of the prism 13.

A material transparent to the light ray to be switched and having a high refractive index should be used as the material of the prism 13. For instance, rutile ($TiO_2$) and GaP are suitably used for switching visible rays and infrared rays, respectively.

The thin film of electroopitcal material constituting the reflective control layer can have a monocrystalline structure or a polycrystalline structure. In contrast, the thin film of heat-sensitive optical material need not always have a crystalline structure: namely, an amorphous structure may be used for this purpose. For instance, a thin film of $LiNbO_3$ having an amorphous structure exhibits a drastic change or refractive index in response to the heat. The amount of the change in refractive index of this amorphous material is more than ten times as large as that of the single crystal of $LiNbO_3$.

EXAMPLE 1

A practical example of the optical valve of the invention will be explained hereinunder with reference to FIG. 1. In this example, rutile having a refractive index of 2.6 is used as the material of the prism 13. The angle α formed between each side surface and the bottom surface of the prism 13 is 61°. A thin film 15 of amorphous $LiNbO_3$, having a thickness of 1 μm and a refractive index of 2.25, is formed as the reflective control layer by sputtering on the bottom surface 14 of the prism 13. The outer surface 17 of the thin film is roughened by #800 grain abrasive and a thin film of nickel-chrominum alloy is formed on the roughened surface by evaporation. A He-Ne laser beam 16 is applied through the light input surface 11 of the prism 13 at a right angle to this surface 11. The critical reflection angle at the boundary 14 between the prism 13 and the thin film 15 of $LiNbO_3$ is 59.5°, so that the laser beam 16 is totally reflected because the angle of incidence is 61°. However, as electric power is suppoed to the thin film of nickel-chromium alloy, the refractive index of the thin film of $LiNbO_3$ is increased to 2.3 due to the heat generated in the nickel-chromium alloy. Consequently, the reflective critical angle is increased to 62.2° so that the laser beam having the incidence angle of 61° is never reflected totally by the boundary 14. The original refractive index is resumed as the power support to the thin film 15 of nickel-chromium alloy is switched off, so that the laser beam is totally reflected again. This optical valve shows an intensity ratio of 1.0:0.1; namely, while the intensity in the "on" state of the valve is 1.0, the intensity in the "off" state was 0.1. This example showed quite a short switching time length of several microseconds.

EXAMPLE 2

Another example will be explained hereinunder with reerence to FIG. 3. Unlike the first example in which the outer surface 17 of the think film of $LiNb_3$ is roughened, the optical valve 30 of this example has an additional prism 32 of the same material as the prism 13 adhered to the surface of the thin film 15 of $LiNbO_3$. With this arrangement, the light 162 having passed through the boundary 14 is radiated from the side surface 33 of the prims 32 without making a diffused reflection. The incidence angle and other conditions are the same as those of Example 1. In the optical valve of Example 2, the intensity ratio of the reflected light was 1.0:0.05; namely, while the intensity in the "on" state of the optical valve was 1.0, the intensity in the "off" state was 0.05.

EXAMPLE 3

The optical valve of Example 3 is identical to that of Example 2 except that the reflective control layer 15 which is 2 μm thick is formed from an electro-optical material PLZT9/65/35. A pair of parallel electrodes were formed on the reflective control layer 15, with a width of 1 mm evaporation. In this example, an extinction ratio of 1:0.05 in terms of the light quantity of the reflected light 161 between the "on" and "off" states of the optical valve was obtained by applying a voltage of 1 KV between these two electrodes. This optical valve showed also a switching speed of 50 nanosectonds. The inventors have confirmed that the chemical composition of the reflective control layer can be varied widely without substantially impairing the advantage of the invention. For instance, in the case of PLZT, a satisfactory result can be obtained even if the contents of La and/or Zr are reduced to zero to change the composition into PLT or PT.

INDUSTRIAL APPLICABILITY

The optical valve of the invention is capable of switching light at high speed and can function as a valve for all kinds of light beams including laser and white light beams. This optical valve, therefore, finds various uses as optical parts such as switches and modulators for optical communication, as well as parts of various types of equipment which makes use of light such as projection-type televisions and the like.

What is claimed is:

1. An optical valve for controlling a light beam having a predetermined wavelength, comprising:
    a first prism having a predetermined light refractive index, said prism including a light input surface through which said light beam enters said prism, a light output surface through which said light beam emerges from said prism and a bottom surface;
    a light-reflective control layer deposited by sputtering on the bottom surface of said first prism, said light reflective control layer being constituted by a thin film made of a heat-sensitive optical material composed of at least one compound selected from the group consisting of $ABO_3$ type compounds sillenite compounds oxides of transition metals, said film having a thickness not less than the wavelength of said light beam, the light refractive index of said light-reflective control layer being lower than the light refractive index of said first prism;
    means for thermally controlling the light refractive index of said light reflective control layer; and
    means provided on the outer surface of said light-reflective control layer, said means preventing total-reflection of the light beam impinging upon the bottom surface of said prism.

2. An optical valve according to claim 1, wherein said total-reflection preventing means is a roughened surface formed on the outer surface of said reflective control layer.

3. An optical valve according to claim 1, wherein said total-reflection preventing means is a second prism made of a material having a light refractive index which is larger than the light refractive index of said first prism and is affixed to the outer surface of said reflective control layer.

4. An optical valve according to claim 3, wherein the light input and light output surfaces of said first prism are coated with non-reflective coatings.

5. An optical valve according to claim 3, wherein said first and second prisms are selected from the group consisting of rutile and GaP.

6. An optical valve according to claim 1 wherein the light input and light output surfaces of said first prism are coated with non-reflective coatings.

7. An optical valve according to claim 1, wherein said heat-sensitive optical material, is electrically conductive, and wherein electrodes are directly adhered to said reflective control layer.

8. An optical valve according to claim 1, wherein said means for thermally controlling the light refractive index of said light-reflective control layer is made of a thin film of a nickel-chromium alloy attached to said reflective control layer.

9. An optical valve according to claim 8, wherein said heat generating member is in the form of a horse-shoe shaped thin film.

10. An optical valve according to claim 1, wherein said group of $ABO_3$ type compounds consists of $LiNbO_3$, $LiTaO_3$, PLZT, PBZT, KTN and SBN.

11. An optical valve according to claim 1, wherein said group of sillenite compounds consists of BGO and BSO.

12. An optical valve according to claim 1, wherein said first prism is selected from the group consisting of rutile and GaP.

13. An optical valve according to claim 1, wherein said oxides of transition metals are selected from the group consisting of $TiO_2$ and $Nb_2O_5$.

14. An optical valve for controlling a light beam having a predetermined wavelength, comprising:
    a first prism having a predetermined light refractive index, said prism including a light input surface through which said light beam enters said prism, a light output surface through which said light beam emerges from said prism and a bottom surface;
    a light-reflective control layer deposited by sputtering on the bottom surface of said first prism, said light reflective control layer being constituted by a thin film made of an electro-optical material composed of at least one compound selected from the group consisting of $ABO_3$ type compounds, having an outer surface and having a thickness not less than the wavelength of said light beam, the light refractive index of said light-reflective control layer being lower than the light refractive index of said first prism;
    means for electrically controlling the light refractive index of said light-reflective control layer; and
    means provided on said outer surface of said light-reflective control layer, said means preventing total-reflection of the light beam impinging upon the bottom surface of said prism.

15. An optical valve according to claim 14, wherein said group of $ABO_3$ type compounds consists of $LiNbO_3$, $LiTaO_3$, PLZT, PBZT, KTN and SBN.

* * * * *